United States Patent
Amir et al.

(10) Patent No.: US 10,313,523 B2
(45) Date of Patent: *Jun. 4, 2019

(54) REMOTE DISTANCE ASSISTANCE SYSTEM AND METHOD

(71) Applicant: TechSee Augmented Vision Ltd., Herzliya (IL)

(72) Inventors: Yoffe Amir, Tel-Mond (IL); Eitan Cohen, Tel Aviv (IL)

(73) Assignee: TechSee Augmented Vision Ltd., Herzliya (IL)

(*) Notice: Subject to any disclaimer, the term of this patent is extended or adjusted under 35 U.S.C. 154(b) by 0 days.

This patent is subject to a terminal disclaimer.

(21) Appl. No.: 16/196,818

(22) Filed: Nov. 20, 2018

(65) Prior Publication Data

US 2019/0089833 A1 Mar. 21, 2019

Related U.S. Application Data

(63) Continuation of application No. 15/366,483, filed on Dec. 1, 2016, now Pat. No. 10,182,153.

(51) Int. Cl.
| | | |
|---|---|---|
| *H04M 3/51* | (2006.01) | |
| *G06T 1/20* | (2006.01) | |
| *G06F 3/048* | (2013.01) | |
| *G06T 11/60* | (2006.01) | |
| *H04L 29/06* | (2006.01) | |

(Continued)

(52) U.S. Cl.
CPC .......... *H04M 3/5183* (2013.01); *G06F 3/048* (2013.01); *G06T 1/20* (2013.01); *G06T 11/60* (2013.01); *H04L 65/4007* (2013.01); *G06Q 30/016* (2013.01); *H04M 7/0045* (2013.01); *H04M 2201/50* (2013.01); *H04M 2203/651* (2013.01)

(58) Field of Classification Search
CPC ....... H04M 3/5183; H04N 7/185; G06T 11/60
See application file for complete search history.

(56) References Cited

U.S. PATENT DOCUMENTS

| | | | |
|---|---|---|---|
| 2002/0044104 A1 | 4/2002 | Friedrich et al. | |
| 2008/0030575 A1* | 2/2008 | Davies | H04N 7/185 348/92 |
| 2013/0278635 A1* | 10/2013 | Maggiore | G06T 19/006 345/633 |

FOREIGN PATENT DOCUMENTS

| | | |
|---|---|---|
| EP | 0943972 | 9/1999 |
| WO | WO 2007/066166 | 6/2007 |
| WO | WO 2009/036782 | 3/2009 |

* cited by examiner

*Primary Examiner* — Nafiz E Hoque
(74) *Attorney, Agent, or Firm* — Finnegan, Henderson, Farabow, Garrett & Dunner LLP

(57) ABSTRACT

Techniques for conducting a support session and determine suitable instructions for resolving a certain technical malfunction in a device/equipment of a user. Imagery data associated the technical mal-function is received from a user's device and used for determining at least one improperly setup property associated with the mal-function in the mal-functioning device/equipment based on a comparison of the received imagery data with reference data. Instructions comprising augmented imagery for resolving the mal-function can be then generated, or fetched form a database, based on the determined at least one improperly setup property. A new database record can be generated comprising the augmented imagery data for use in future support sessions associated with the mal-function.

20 Claims, 5 Drawing Sheets

(51) Int. Cl.
*G06Q 30/00* (2012.01)
*H04M 7/00* (2006.01)

REMOTE DISTANCE ASSISTANCE SYSTEM AND METHOD

CROSS REFERENCE TO RELATED APPLICATIONS

This is a continuation of pending U.S. patent application Ser. No. 15/366,483, filed Dec. 1, 2016, the disclosure of which is incorporated herein by reference.

TECHNOLOGICAL FIELD

The present invention is generally in the field of remote distance assistance, and particularly relates to system and method for remotely diagnosing and expert assistance in resolving technical problems.

BACKGROUND

Technical support systems utilized nowadays makes it difficult for digital service providers (DSPs), and especially for service/technical support centers, to provide efficient (in terms of time and customer satisfaction) technical support services to their customers (also referred to herein as remote users). Though, there is a strong push nowadays toward self-service schemes, yet customer's adoption levels of self-service technologies are rather low. Today's Customer Support model is subject to the following challenges:

The customer environment and support needs have become very complex, which is expected to grow exponentially with the expansion of internet of things (IoT);

Voice-based contact with remote users is typically used for technical and service support around the globe, but is suffers from challenges like communication gaps, diagnosis challenges, limited problem solving rates and customer frustration;

Customer service over the phone is becoming increasingly expensive due to declining average revenue per unit (ARPU); and Technicians dispatch is becoming very expensive, non-scalable and a source for customers' dissatisfaction.

Therefore, Service and Product companies focuses nowadays mainly on solving the problems derived from the above challenges i.e., the high cost of support, the low customers' satisfaction, and the limited ability to scale support to the incoming IoT boom.

During the past years there has been a significant change in the way people communicate and use mobile telecom services. There is a noticeable shift from the traditional telecom, voice and SMS, services, to a more data-centric mobile phone experience. The transition from call service provider (CSP) to digital service provider (DSP) has been driven by the mass consumption of cellular data, which is accelerated as long-term evolution (LTE) services are rapidly being deployed, alongside existing 3G and 4G services. In fact, nowadays DSPs conduct more than 80% of their transactions through online digital channels.

Contact centers have also undergone an irreversible evolution over the last decade. The results of the 2015 Global Contact Centre Benchmarking Report confirm a continued, dramatic change. Digital contact, in the form of mail, web chat, social media, and self-service channels, continues its explosive growth as popular engagement methods, and more and more contact/support centers around the world no longer want to use the traditional vocal telephone communication to communicate with organizations/customers.

The present disclosure provides remote assistance techniques for efficiently identifying technical faults and/or improper equipment setups/configurations, and determining a most likely solution to resolve them. For example, and without being limiting, the techniques disclosed herein can be used in interactive self-assembly applications, installation and troubleshooting of faults in items e.g., self-construction of items/equipment such as furniture, consumer electronics, appliances and even person to person video aided support. An aim of some of the embodiments disclosed herein is to minimize the burden, and the accompanied frustrations, of users/customers attempting to assemble items or trying to rectify/fix faulty equipment/instruments.

The techniques disclosed herein thus aim to provide remote efficient user/client support services, that in many cases can be used to avoid sending high skilled technicians to the user/customer. For example, the techniques disclosed herein are usable for technical support centers of companies, and usable for shortening of the over the phone service time per customer and to reduce the technician dispatch rate.

Some solutions known from the patent literature are briefly described herein below.

International Patent Publication No. WO 2007/066166 discloses a method to process and display control instructions and technical information for an equipment, plant or process in an industrial facility. A software entity may be configured with identities of selected said equipment, plant or processes. The software entity may also retrieve information associated with said equipment, plant or process by means of being so configured. Information may be combined and annotated on a display device to provide control or maintenance instructions. A display device, a computer program and a control system are also described.

International Patent Publication No. WO 2009/036782 describes a virtual community communication system where two or more technicians carry or access an augmented reality (AR)—enhanced apparatus to communicate and exchange, over a LAN or the Internet, information regarding assembly or servicing or maintenance operations performed on complex machinery. Data streams exchange between the peers of the virtual community is performed by means of a centralized server. Various arrangements are presented that can be selected based on the needs of the operation to be performed, such as the number of members of the community and the type of communication equipment. The system is applicable to any application of the virtual community communication system and is optimized for application to industrial machinery.

GENERAL DESCRIPTION

There is an ongoing demand for efficient customers' service centers capable of quickly diagnosing and efficiently resolving problems encountered by their remote users. However, the traditional voice call support paradigm is rarely capable of addressing the requirements of establishing efficient and cost effective customer support centers. At best, the conventional telephone voice call based support centers are capable of identifying a limited number of faults by tediously interrogating their remote end users over the phone in attempt to gather meaningful information for resolving the encountered problems. In many events the regular end user is not capable of correctly defining the experienced problems/difficulties nor to provide the support center with meaningful information for solving it, such that in many cases a skilled technician is eventually sent to resolve the problem at the user's remote site (e.g., home, office, etc.).

The present application provides techniques and tools for improving the abilities of support centers to quickly identify failures/defects in faulty items/equipment at the remote user's site, and for quickly matching a working solution to the identified failures/defects. The amount of information exchanged between the remote end user and the support center is considerably increased by using at the remote site a communication device capable of exchanging imagery and auditory, and optionally also text, data (e.g., smart phone, PDA, laptop, tablet, and suchlike, which generally referred to herein as user's device) for establishing a support video session with the support center.

Upon establishing the video support session, the support center processes and analyzes the auditory and imagery (and optionally text) data received from the remote end user for identifying in the faulty item/equipment failures/defects causing the problems experienced by the remote user. The support center provide the expert-supporter tools for adding annotations, signs and/or symbols to the imagery data (still images or video frames) received from the remote user for conveying instructions to the remote user showing the actions required to resolve the experienced problem. The annotated imagery data is then played/presented in the display of the user's device, and whenever the remote user manage to successfully resolve the problem by following the illustrated instructions, a database record system is constructed in order to record the encountered problem and the solution used to resolve it. This way, a database of working solutions is established gradually, which are used by the support cncter for solving problems in future support sessions conducted by the support center representatives.

The disclosed techniques utilize computer vision tools having tracking capabilities for identification of complex objects/elements within the scene, and for allowing tracking of such complex objects in sophisticated/challenging visioning conditions e.g., poorly lighted scenes characterized in fast camera movements in close proximity to the objects, and when the relevant object is immersed within a complex background. In some embodiments these capabilities are implemented by use of neural network tools. This way a multitude (thousands) of video streams can be analyzed by systems implementing the techniques disclosed herein to assist in the technical support sessions thereby conducted.

The present application thus provides techniques for conducting visual technical support sessions allowing remotely solving in real-time problems experienced by users. The techniques disclosed herein allows the supporter to see the same scenes the user is exposed to, and instruct the user in real time while the imagery data is acquired and delivered to the support system. The imagery data obtained from the remote end user is used by the supporter to illustrate a possible solution to the experienced problem by introducing various annotations into the imagery data and thereby produce augmented reality built on the acquired scene for providing the user with instructions on how to resolve the encountered problem.

Various tools were developed to continuously maintain the database records and discard database records that are not relevant or valid, inefficient, and/or rendered obsolete, and to facilitate real time matching of best working solutions from the database records to ongoing support sessions conducted by the support center. The techniques disclosed herein can be thus used to develop visual cellular chatbots configured to provide automated customer support services providing self-service tools for resolving technical problems encountered by the users.

Optionally and in some embodiments preferably, the video support session between the support center and the user's device is activated by the user after receiving an activation link embedded in a text message (e.g., SMS, WhatsApp or email) sent from the support center. By clicking on/accessing the embedded link the user opens the support session described herein and establishes the video support session communication with the support center. Optionally, the support session is achieved by mean of an application installed on user's device and configured to establish the video support session communication with the support center.

One inventive aspect of the subject matter disclosed herein relates to a support system for diagnosing and resolving a mal-function in a user's equipment, the support system comprises a computerized system configured to receive imagery data of the user's equipment. The computerized system comprises an image recognition module configured and operable to process the imagery data and identify in it at least one property of a setup configuration of the equipment and generate setup configuration data indicative thereof, and a processor utility configured and operable to compare the setup configuration data with reference data indicative of one or more improperly setup properties, match the at least one identified setup configuration property with at least one of the improperly setup properties in the reference data, determine at least one improperly setup property associated with the mal-function of the user's equipment, and provide instructions data for resolving the mal-function.

The processor utility can be configured and operable to generate guiding instructions for the image recognition module to guide the processing of the imagery data based on keywords received from an operator of the system. Optionally, and in some embodiments preferably, the operator/supporter provides the processing utility with images, or some portions/segments thereof, for guiding the processing of the imagery data. The processing utility can be thus configured to compare the images received from the operator/supporter to the imagery data received from the users device, to identify the at least one property of a setup configuration of the equipment and generate the setup configuration data indicative thereof, based on the images received from the operator/supporter.

The system can comprise an optical character recognition module configured and operable to identify textual information in the imagery data for aiding the image recognition module in the processing of the imagery data.

Optionally, and in some embodiments preferably, the at least one setup configuration property identified by the image recognition module comprises either at least one hardware component or at least one software component associated with a graphical user interface.

In some possible embodiment a repository of working solution records is used in the system for providing the instructions data for resolving the mal-function. The instructions data provided by the processor utility can thus comprise at least one working solution record obtained by the processor utility from the repository based on the determined at least one improperly setup property.

An image processing module can be used to superimpose onto the imagery data annotations indicative at least in part of the instructions data. The instructions data can thus comprise the annotated imagery data generated by the image processing module. The system can use at least one tracker module to adjust at least one of orientation, size and location, of the annotations superimposed in at least one of the images of the user's equipment. Optionally, and in some embodiments preferably, the processor utility is configured and operable to generate in the repository a new working solution record comprising the instructions data with its respective annotated imagery data.

The processor utility can be also used to process the working solutions records in the repository and assign to each of the records a rank indicative of its ability to resolve a mal-function. In some embodiments the processor utility is configured to remove from the repository records of working solution having low ranks, and maintain in the repository only records of working solution having high ranks.

In some embodiments the computerized system is configured to receive auditory data from the user. in this case, a speech analysis module can be used to process the received auditory data and identify in it at least one keyword associated with the mal-function. Optionally, and in some embodiments preferably, the processor utility is configured and operable to generate guiding instructions for the image recognition module to guide the processing of the imagery data based on at least one of image segments or portions, the keywords identified in the auditory data by the speech analysis module, and/or keywords received from an operator/supporter of the system.

In some embodiments the auditory and imagery data are generated by a user device. The processor utility can be used in this case to establish voiceless video communication with the user device responsive to at least part of the auditory data, for exchanging voiceless video data therewith comprising the imagery data of the user's equipment. Optionally, and in some embodiments preferably, the processor utility is configured to send the user device instructions for setting up the voiceless video communication therewith. Thus, the voiceless video communication can be established upon receipt and carrying out the instructions by the user device.

In some embodiment the system is used in a support center configured to concurrently conduct a plurality of support sessions for resolving mal-functions in a respective plurality of users' equipment. Optionally, and in some embodiments preferably, the instructions for setting up the voiceless video communication comprises a network address of a computer server configured to establish the voiceless video communication between the user device and the support center. The computer server can be implemented either at the support center or at a remote site.

In some possible embodiments, the computer server is implemented at a remote site and being configured and operable to implement at least one of the image recognition module, tracker and/or image processing module used with the imagery data, and at least some functions of the processor utility.

Another inventive aspect of the subject matter disclosed herein relate to a computer implemented method for use in tech-support. The method can be implemented by a processing unit configured and operable to provide automated, semi-automated or live tech-support trouble shooting. The method comprises: providing the processing unit imagery data associated with a support session carried out in connection with a certain technical mal-function of a device of a user, providing the processing unit reference data associating the mal-function with one or more improperly setup properties; applying by the processing unit machine vision processing to the imagery data to identify at least one property of a setup configuration of the device; and comparing by the processing unit the at least one property with the one or more improperly setup properties to determine at least one improperly setup property associated with the mal-function of the device. In some embodiments deep-learning is used in the machine vision processing for analyzing the imagery data and identifying the at least one property.

Optionally, and in some embodiments preferably, the method comprises applying at least one of natural language processing (NLP) and/or expert pointer and/or keyword typed by the expert and/or speech analysis to human communication carried out during the support session to determine the certain technical mal-function in order to allocate the most relevant reference cases. The at least one property can comprise at least one component of the device associated with the technical mal-function. The method can thus comprise applying at least one of natural language processing (NLP) and/or expert pointer and/or keyword typed by the expert and/or speech analysis to human communication carried out during the support session to guide the machine vision process in identifying the at least one component in the imagery data.

In some embodiments the method comprises querying, based on the determined at least one improperly setup property associated with the mal-function, a multimedia library comprising one or more multimedia records each including at least one of imagery and auditory information indicative of rectification of respective improperly setup property and retrieving from the multimedia library at least one multimedia record for rectifying the improperly setup property. In addition, a data library comprising one or more sets of instructions records associated with rectification of respective improperly setup property can be used to retrieve therefrom at least one record of specific set of instructions for rectifying the improperly setup property and communicating the at least one record to the user.

The method can thus comprise applying image processing to the imagery data to augment the imagery with indicia indicative of one or more actions that should be carried out in accordance with the specific set of instructions for rectifying the improperly setup property, thereby giving rise to augmented imagery data; and communicating the augmented imagery data to the user.

In some embodiments the specific set of instructions includes data indicative of configurations of one or more components of the device associated with the properties of the setup configuration. The image processing can comprises: retrieving from an image data storage one or more characteristic images of the one or more components; utilizing the characteristic images to apply deep learning to the imagery data to identify the one or more components in the imagery data and determine their respective locations in the imagery data; augmenting the imagery data by embedding the indicia indicative of at least one action of the actions; whereby the at least one action is associated with at least one of the components and the indicia is being selected in accordance with a type of the action and is embedded in the imagery to be located in proximity to a respective location of the at least one component.

In some embodiment the one or more components include either at least hardware component or at least software components associated with graphical user interface.

The method can comprise creating a new library record comprising the augmented imagery data for use in future trouble shooting sessions associated with the mal-function. Optionally, the method comprises removing the background of the imagery data contained in the new library record.

Optionally, and is some embodiments preferably, the method comprises determining for each of the improperly setup properties associated with the mal-function a weight indicative of a likelihood that the improperly setup property is causing the mal-function, and using the weights to prioritize the retrieving of the at least one library record. The method can also comprise using the weights to determine an ordered set of data records to be communicated to the user, and communicating to the user one of the records at a time until the mal-function is resolved.

The method can also comprise determining a score for each record on the data library indicative of its success in resolve users' problems in previous support sessions. Optionally, and in some embodiments preferably, the method comprise discarding records of the data library having low scores.

Yet, another inventive aspect of the subject matter disclosed herein relates to a method for use in a support session, to provide automated or semi-automated tech-support trouble shooting. The method comprising: providing imagery data associated with a trouble shooting session carried out in connection with a certain technical mal-function of a device of a user, providing reference data associating the mal-function with one or more improperly setup properties; applying image processing to the imagery data to augment the imagery with indicia indicative of one or more actions that should be carried for rectifying at least one of the improperly setup properties associated with the mal-function, thereby giving rise to augmented imagery data; and creating a new library record comprising the augmented imagery data for use in future trouble shooting sessions associated with the mal-function. The method can comprises updating the reference data with a weight indicative of a likelihood that the improperly setup property is causing the mal-function, based on results of rectification of the improperly setup property in resolving of the mal-function in the user device.

The method comprises in some embodiments receiving a support request from the user in a telephone voice call from the user's device, sending the user's device a network address to obtain in the user's device instructions for establishing a bidirectional video communication therewith, and conducting the support session after the bidirectional video communication with the user's device been established.

A further inventive aspect of the subject matter disclosed herein relates to a method for conducting a support session. The method comprises requesting support in a telephone voice call from a user's device to a support center, receiving from the support center a network address of a remote server, using the remote server to establish a bidirectional video communication between the user's device and the support center, and providing the support center imagery data associated with a support session carried out in connection with a certain technical mal-function of a device of the user, to thereby cause the support center to determine instructions for resolving the technical mal-function based on a comparison of at least one property of a setup configuration identified in the imagery data with reference data associating the mal-function.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which.

DETAILED DESCRIPTION OF EMBODIMENTS

One or more specific embodiments of the present disclosure will be described below with reference to the drawings, which are to be considered in all aspects as illustrative only and not restrictive in any manner. In an effort to provide a concise description of these embodiments, not all features of an actual implementation are described in the specification. This invention may be provided in other specific forms and embodiments without departing from the essential characteristics described herein.

Support sessions techniques and systems are disclosed, wherein a bidirectional video communication is established between a technical support person and a remote user to provide additional layers of information exchange therebetween, thereby expanding the abilities of the system to detect failures/defects in a faulty item/equipment, and of illustratively conveying solutions to the remote end-user. The bidirectional video communication can be achieved without requiring installation of a dedicated video support session application in the user's device. In some embodiments, after a telephone call is received from the remote user in the customer support center, the expert/supporter verify the end-used own a smartphone, and then sends a link (e.g., embedded in a text message) to the user's device (e.g., smartphone), and the bidirectional video stream is established once the customer clicks on the link received from the support center.

The bidirectional video communication enables the expert/supporter to see the environment at the remote site of the user, as captured by the back camera of the user's device, and thereby allows providing the remote user with substantially accurate instructions for resolving the encountered problem.

Figure 1A:
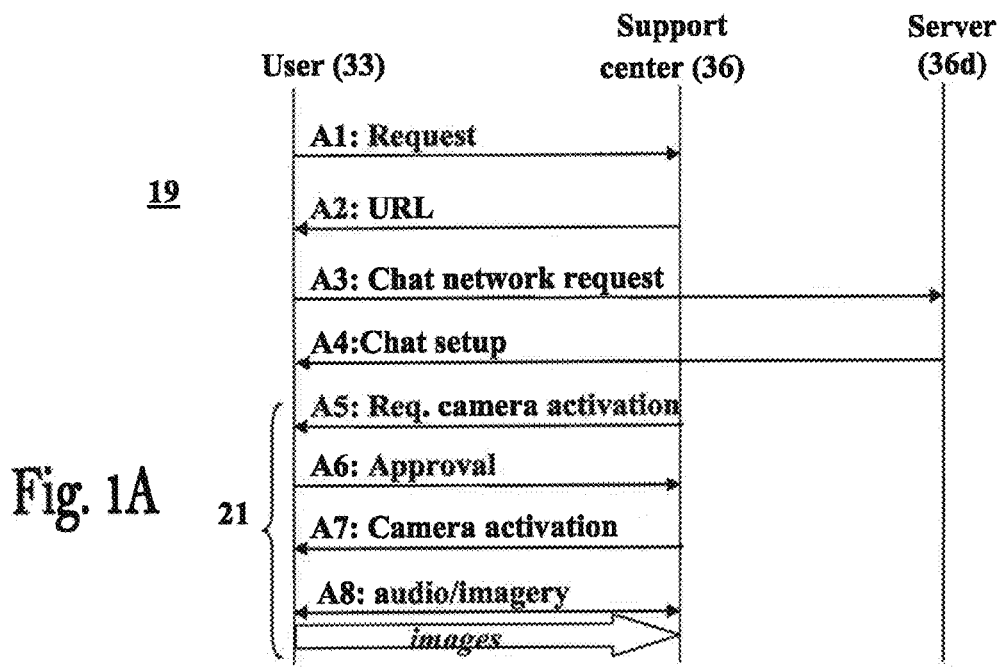
FIG. 1A to 1C schematically illustrate support sessions according to some possible embodiments, wherein FIG. 1A a sequence diagram showing possible stages in the communication establishment and FIGS. 1B and 1C schematically illustrate exchange of video streams between the remote user and the support center.
Figure 1B:
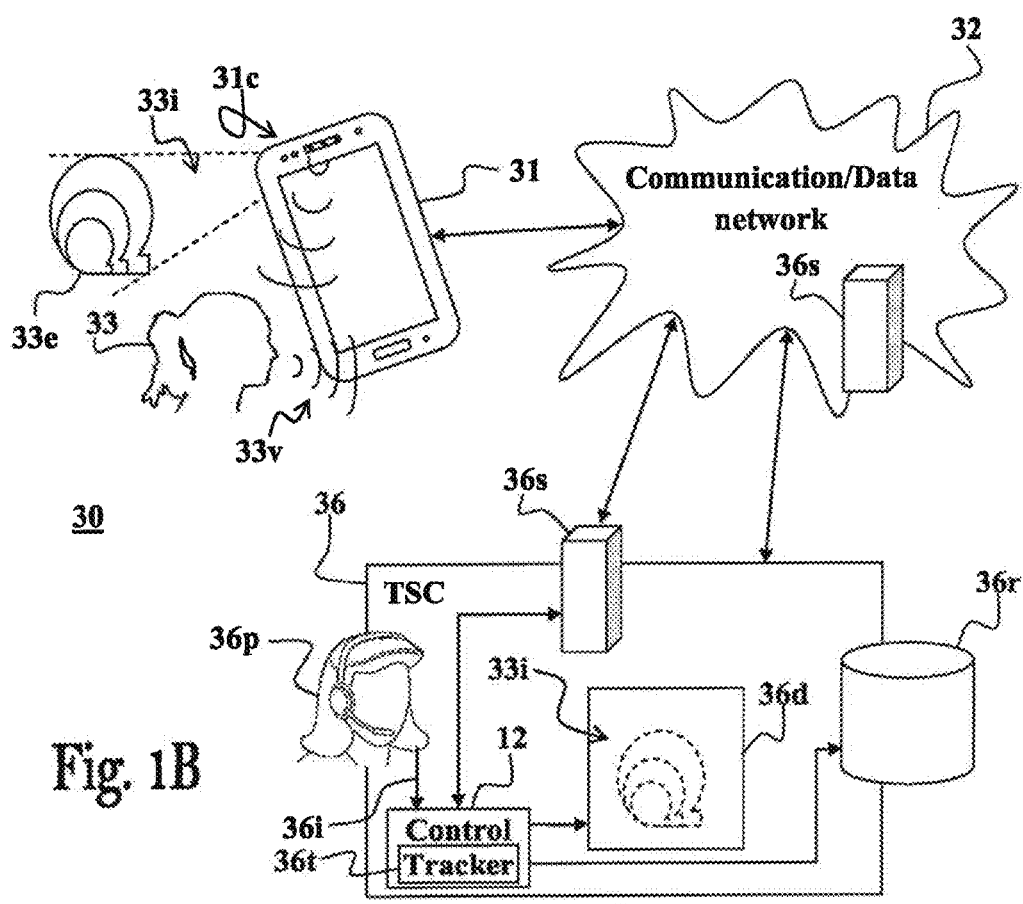

With reference to FIGS. 1A and 1B, a support session 19 is initiated (A1), in some embodiments, when the remote user 33 calls the technical support center (TSC) 36 to request technical support (e.g., report a fault, or request assistance to configure/assemble an item/equipment). While is some possible embodiments the initiation step (A1) is performed by a regular (i.e., over cellular and/or landline networks) telephone call to the support center, it may as well be performed over other communication channels e.g., satellite communication, voice over IP, and suchlike. In response to the user's call, the TSC 36 sends a message (A2: e.g., SMS, email, WhatsApp, or suchlike) comprising a link/network address (e.g., URL). By accessing (A3) the received link (e.g., by clicking, or touching a display thereon on a touchscreen), a remote computer/server 36s is accessed by the user's device 31 over the network 32, wherefrom video support session setup instructions/code (A4) are sent to the user's device 31. The remote server 36s may be implemented as part of the support center and/or in a cloud computing infrastructure accessible for both the users and the support center.

Upon receiving the video support session setup instructions, a video support session (21) is established. The video support session (21) may include a request (A5) for the user's approval that the TSC 36 activate the back camera 31c of the user's device 31 during the video support session for sending imagery data 33i (e.g., video stream in parallel with the verbal interaction on the cellphone 33v) to the TSC 36. Once the user 33 approves (A6) the request, a video support session (A5) is established in parallel to the on-going audio chat, that allows the supporter 36p to see on a display terminal 36d the scene comprising the faulty item/equipment 33e as it is captured by the camera 31c of the user's device 31 (e.g., in video or stills mode, depending on the data communication bandwidth or by choosing such option manually).

Optionally, and in some embodiments preferably, the support session 19 is configured to superimpose on the initiating voice call (A1) a video layer performed via a data network (e.g., the Internet). Accordingly, the support session of some embodiments comprises a voice call communication channel to which a video communication channel is added, exchanging only imagery data i.e., the video communication does not include voice data, but only image frames or still images. It is however noted that the voice call channel may be implemented by voice-over-ip communication (e.g., WhatsApp, Viber, and suchlike).

After the user 33 defines verbally (33v) the problem and/or reasons for which the support is needed (A1), and the audio-video video support session (A8) is established, the supporter 36p instructs the user 33 to point the camera 31c toward the faulty item/equipment 33e, to obtain a video/imagery stream 33i combined with the verbal 33v description of the user 33, for facilitating figuring out the right solution, and providing such solution as instructions and actions to be carried out by the user 33. This process (19) may be conducted iteratively in real time until the user's problem is resolved. Only in the event that the supporter/TSC system 36 did not manage to resolve the user's problem, a skilled technician might be sent to resolve the user's problem.

The techniques described herein enables the supporter 36p to superimpose in real time on the captured images of the video stream markers and/or annotations created manually, or selected from a pre-prepared library, and apply them on the relevant objects/elements under discussion, for further clarification. These markers or annotations are attached to the object during the video session using a video tracker, so even if there is a relative movement between the user's device 31 (smartphone camera) and the object 33e the markers and annotation remain anchored to the object. Alternatively, this can also be done by taking snapshots from the live video 33i and drawing symbols, markers or annotations in order to clarify the guidance to the customers. One or more databases 36r of images and/or videos are used in some embodiments to record data about the problems encountered by the remote users 33, and about the solutions that managed to resolve them, including the imagery data with the added markers and/or annotations. Optionally, the imagery data is recoded after the background appearing in them is removed therefrom.

The control unit 12 of the TSC 36 is configured and operable to display the video stream received from the user's device 31 in a display device 36d at the TSC 36, and provide the supporter 36p with image processing tools for adding the annotations, symbols or markers, into video frames or into the stills images received from the user's device 31. The control unit 12 is further configured and operable to send the images/videos frames with the annotations/instructions introduced by the supporter 36p to the user's device 31 for displaying them to the remote user.

As shown in FIG. 1B, the computer/server 36s used to conduct the video communication between the user 33 and the support center 36 may be implemented in the support center 36, and/or in a remote data network 32 e.g., in a server farm or in a cloud computing environment. Optionally, and in some embodiments preferably, the remote server/computer is also configured to carry out some of the tasks of the control unit 12, such as but not limited to, AR functionality, tracker functionality, image recognition and/or processing.

Figure 1C:
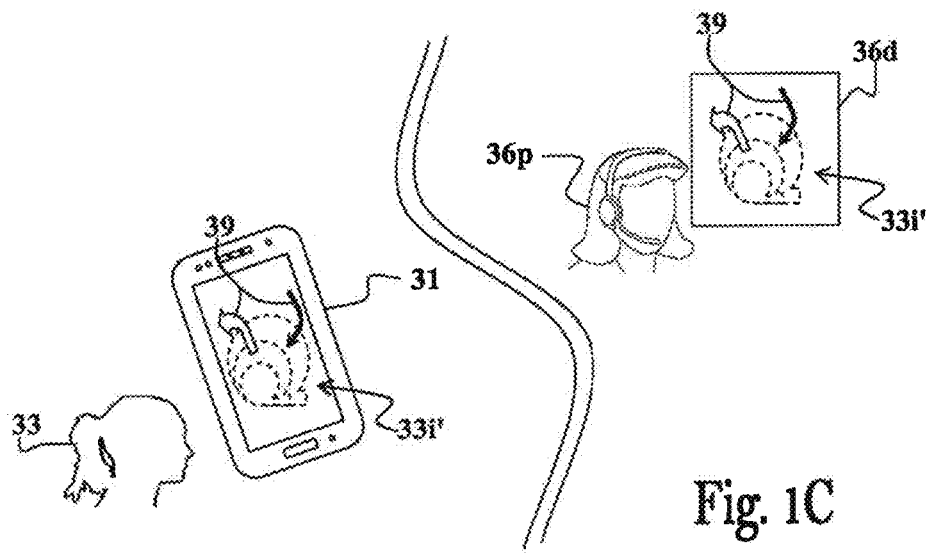

As illustrated in FIG. 1C, in some embodiments the TSC 36 provides the supporter 36p built-in capabilities configured for introducing on-line in real-time the annotations 39 into one or more of the images/video frame acquired by the camera 31c of the user's device 31 i.e., augmented reality tools. The annotations can be manually added to the images using a pointing/mouse device and draw tool/module, and/or any image processing utility having freehand abilities. The images/video frames 33i', with the annotations 39 placed in them by the supporter 36p, are then transferred over the data network 32 to the user's device 31 and displayed in its display.

Additionally or alternatively, the supporter 36p may manually choose predefined symbols/icons and/or functional signs, and place them in the acquired images/video stream 33i, or the video stream, at certain locations/adjacent or on certain objects/elements seen therein. In some embodiments an embedded video tracker is used to attach the symbols and/or annotations 39 placed by the supporter 36p in the images/video stream 33i to the selected objects, and translate and/or resize them whenever there is a relative displacement caused due to movements of the object and/or the camera. Thus, the sizes, relative location in the frame, and/or magnification of the symbols and/or annotations 39 placed by the supporter 36p may change responsive to changes in the location of the camera relative to the faulty item/equipment 33e. In some possible embodiments, more advanced augmented reality (AR) tools are used to create an associative connection between two or more objects seen in the images/video stream 33i using connecting symbols, icons and/or signs, such as arrows, where the pointing direction also has a meaning and significance for resolving the problem.

This way, a bidirectional video communication can be used to provide the supporter 36p with a video stream 33i showing the setup/configuration of the faulty item/equipment 33e, and in the other direction provides the remote end user 33 with an instructive video stream 33i' (an augmented reality video produced from the video stream 33i) with the annotations/markers introduced by the supporter 36p, which may be displaced and/or resized by the video tracker corresponding to movements of the camera 31c of the user's device 31. A video tracker tool/module 36t may be implemented in the control unit 12, or it can be implemented to operate in a remote server/the cloud, and configured and operable to track predefined objects/elements appearing in the video stream 33i received from the remote user 33, and re-acquire the tracked objects/elements if they disappear from the frame and reappear due to movements of the camera 31c.

The video tracker is configured to track the relevant objects/elements under discussion within the video frames and to attach annotations, symbols/icons, signs and/or text, to them during their movement within the video frames, so the expert/supporter and the remote user always can focus on them during the support session, and thereby make the verbal guidance provided by the expert/supporter more comprehendible. The video tracker thus generates a focus on the relevant objects that are needed to be pointed/highlighted to resolve the problem. These objects can be pointed/highlighted either manually by the expert/supporter on the video stream received from the remote user, or automatically by using computer vision algorithms, where their relevance are acknowledged by the expert/supporter or automatically by speech analysis of the main keywords of the discussion text between the expert and the client, or keywords that the expert will provide to the system. Once detected and acknowledged by the expert, the video tracker is applied on these objects simultaneously along with augmented reality that defines the relationship between the different objects within the scene as a guidance tool.

The visual remote guidance/support system 30 thus establish a bridge between the central role of smartphones in modern live and the need of digital services providers to offer efficient, satisfactory technical support at real time. On the other hand, this technology also bridges the physical gap between the contact center and the customer environment. The system 30 combines visual experience provided by the expert 36p instantly connected with user/customer 33 via its smartphone 31, for seeing what the user/customer sees and providing interactive guidance using gestures, annotations and drawings with augmented reality 33i' capability. The supporter 36p is thus capable of on-line showing and instructing in real-time customers/users 33 the actions to be carried out to resolve encountered problems.

Accordingly, the system 30 enable to proactively diagnose faulty item/equipment for increasing the productivity and efficiency, and to resolve issues faster based on a maintained pool of past working solutions i.e., comprising videos and images records that are preselected manually or automatically by the system. The smartphone device 31 is thereby harnessed to conduct support sessions and improve customer satisfaction, decrease technician dispatch rates for resolving user's problems, substantially improve the first call resolution rates, and decreasing the average handling time.

The TSC 36 is configured in some embodiments to record the video support sessions (21) in a repository 36r. This way, the TSC system 36 builds a continuously growing audio/visual data base of user's problems, and of their corresponding working solutions, to be used by computer vision tools to facilitate resolving of user's problems in future technical support sessions. Optionally, and in some embodiments preferably, this database is stored in a network computer/server of the TSC 36 (e.g., in the cloud).

Figure 2:
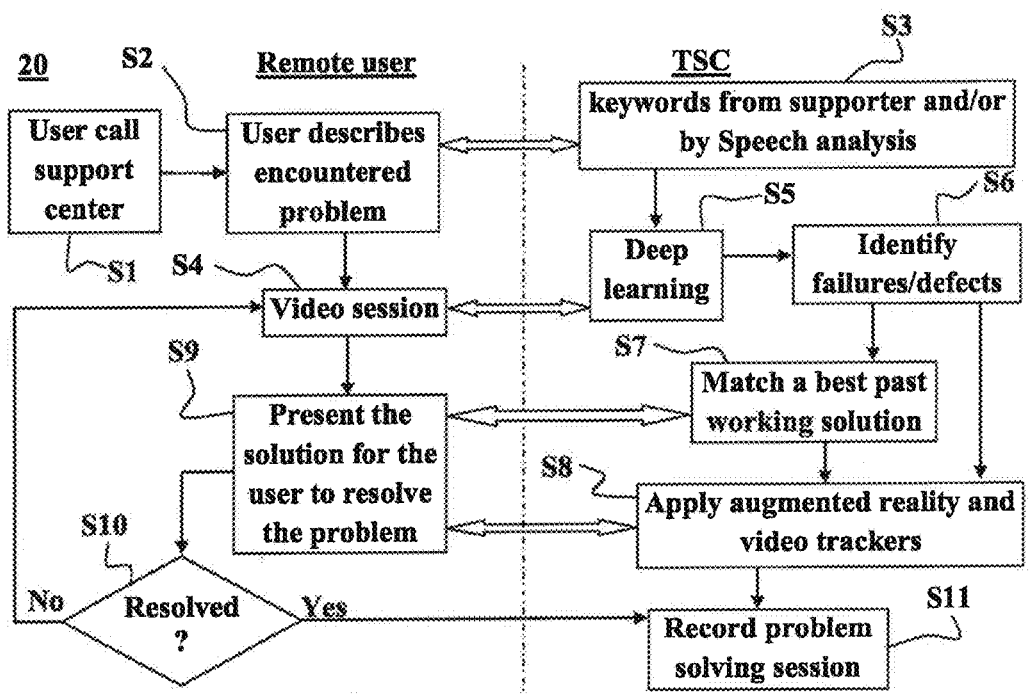
FIG. 2 is a functional flowchart schematically illustrating a support session management according to some possible embodiments.

FIG. 2 is a functional flowchart illustrating a support session 20 according to some possible embodiments. The support session 20 commences by the remote user initiating a telephone call to the technical support center (TSC) (S1), and verbally describing (S2) a problem encountered with respect to an item and/or service supported by the TSC. At the TSC, the auditory signals (S2) received from remote user is processed and analyzed (S3) by speech analysis tools to extract therefrom keywords associated with the faulty item/equipment and/or the nature of the encountered problem.

After the supporter receives enough information from remote user audio/visual communication is established between the TSC and the remote user (S4). The imagery data received from the user device is processed by the TSC (S5) to detect the faulty item/equipment captured in it, and to identify in the imaged item/equipment possible failures/defects (S6) causing the problem encountered by the remote user.

Optionally, and in some embodiments preferably, live support operational mode of the TSC 36 utilizes an embedded on-line computer vision tool configured and operable to identify automatically the relevant objects in the images/video stream 33i, or identify codes, text and/or icons/symbols, that seen on the faulty item/equipment 33e, and to thereby enable the TSC system 36 to identify the type, make, serial number etc. of the faulty item/equipment 33e. In some embodiments the supporter 36p may guide the computer vision tools as to what objects to look for in the images/video stream 33i e.g., by the supporter manually placing a cursor of a pointing device/mouse on/near objects/elements, after understanding the nature of the problem to be resolved.

Alternatively or additionally, speech analysis tools are used to analyze the user's speech 33v and identify keywords pronounced by the user 33 to aid operation of the computer vision tool while it is scanning the imagery data 33i for the relevant objects/elements within the acquired scene. For example, if the speech recognition tool identify words such as internet/network and communication/connectivity in the auditory signals 33v from the user 33, it may guide the computer vision tool to look for LAN sockets or cables, WiFi antennas and/or LEDs indications. Optionally, and in some embodiments preferably, the keywords used for aiding the computer vision tools are typed by the supporter 36p. Upon identifying the relevant objects in the imagery data 33i the TSC system 36 can analyze the current setup/configuration and automatically identify possible faulty conditions therein that cause the problem the user is experiencing, and/or open display windows in the display terminal 36d to present to the supporter 36p the object identified by the system as being relevant to the user's problem.

The TSC can then instruct the end user how to resolve the problems in various different ways. If the problem is relatively simple to resolve (e.g., press the power switch), the supporter can verbally instruct the end user to perform the needed actions. If the end user did not manage to carry out the given verbal instructions, or in case of a relatively complicated scenario, the supporter generates an instructive augmented reality video stream using one or more video trackers (S8) for showing in the display of the end user's device (S9) how to resolve the encountered problem.

Optionally, and in some embodiments preferably, the TSC system interrogates its database to match a best working solution (S7), based on the determined failures/defects, and transmit to the end user the instructions recorded in the database to resolve the problem. The recorded instructions may comprise text, auditory and/or video/augmented reality content, and the supporter may decide to provide the remote user with only a selected type (or all types) of recorded instructive content, and/or some portion, or the entire set of instructions.

After presenting to the remote user the proposed solution (s) in the display of the user's device (S9), the user performs the instructions received from the TSC. During this stage the video stream is continuously received from user's device, thereby allowing the supporter to supervise and verify that remote user carries out the right actions, and to provide corrective guidance if the remote user perform incorrect actions. If the presented instructions carried out by the remote user do not resolve the problem, the video session proceeds in attempt to detect additional failures/defects possibly causing the encountered problem. In the event that the remote user managed to resolve the problem based on the presented instructions, data of the support session 20 is recorded in a new database record at the TSC (S11). The new database record comprises data related to the resolved problem, and/or keywords used by the system to identify the failures/defects, and/or objects/elements in which the failures/defects were found, and/or text, auditory and/or imagery data conveyed to the remote user for resolving the problem.

The TSC is configured to learn the nature of the problem encountered by the remote user from the video stream and/or auditory signals received, learn the best past working solutions and construct database records related to events and successful solutions that the system managed to provide. This database is configured to be continuously updated during the system service lifetime. The system learns and analyses the database and produce over time more and more efficient solutions to failures/defects encountered by the remote users.

The TSC system 36 may be configured to perform periodic/intermittent maintenance procedures to guarantee the effectiveness and validity of the records stored in the database. In some embodiments each database record is monitored during the maintenance procedures, and ranked/scored according to total number of times it was successfully used to resolve a specific problem, and the total number of times it failed to resolve the problem, to determine its successful problem resolving percentage (rank) in real-time technical support sessions (20). The maintenance further comprises in some embodiments discarding the database records that received low ranks during the maintenance, and maintaining only the records that received the higher ranks. Apparently, such database maintenance procedures increases the chances of successfully resolving user's problems in future technical support sessions (20), by using the good working examples used in the past to resolve the same problems.

Big data mining algorithms (dedicated for images and video i.e., video analytics tools) can be used to continuously monitor the accumulated video streams and images database and sort it and classify cases and solutions that will be the base line for the deep learning algorithms described herein. At the initial steps of the system such mining will be done manually, where the experts/supporters will scan the most relevant videos video support session conducted during the day and classify them according to problems they dealt with. Next, the system will scan online the video support sessions and classify them automatically based on the keywords, objects/elements identified in the video stream. In addition, the system will take snapshots automatically of frames from the video stream of relevant objects/elements in-order to classify them and add them to the database for the computer vision algorithm discussed above. Optionally, the background is removed from the snapshots added to the database.

Deep learning algorithms can be used to analyze the images and the videos that were classified by the system, and to deliver the best working solution based on the lessons been learned from all the past support sessions related to a certain class of problems. The system is configured to maintain a database record for each past working solution, classify the records according to the type/class of the solved problem, and rank each record based on several criteria's such as duration, customer satisfaction e.g., based on speech analysis and on line users' ranking, video analysis and clarity of the actions etc.

The system may be configured to scan and analyze previously conducted support sessions maintained in its database, and match in real-time a best working solution for each support session being conducted by the system, based on the problems successfully resolved in previous support sessions.

Figure 3:
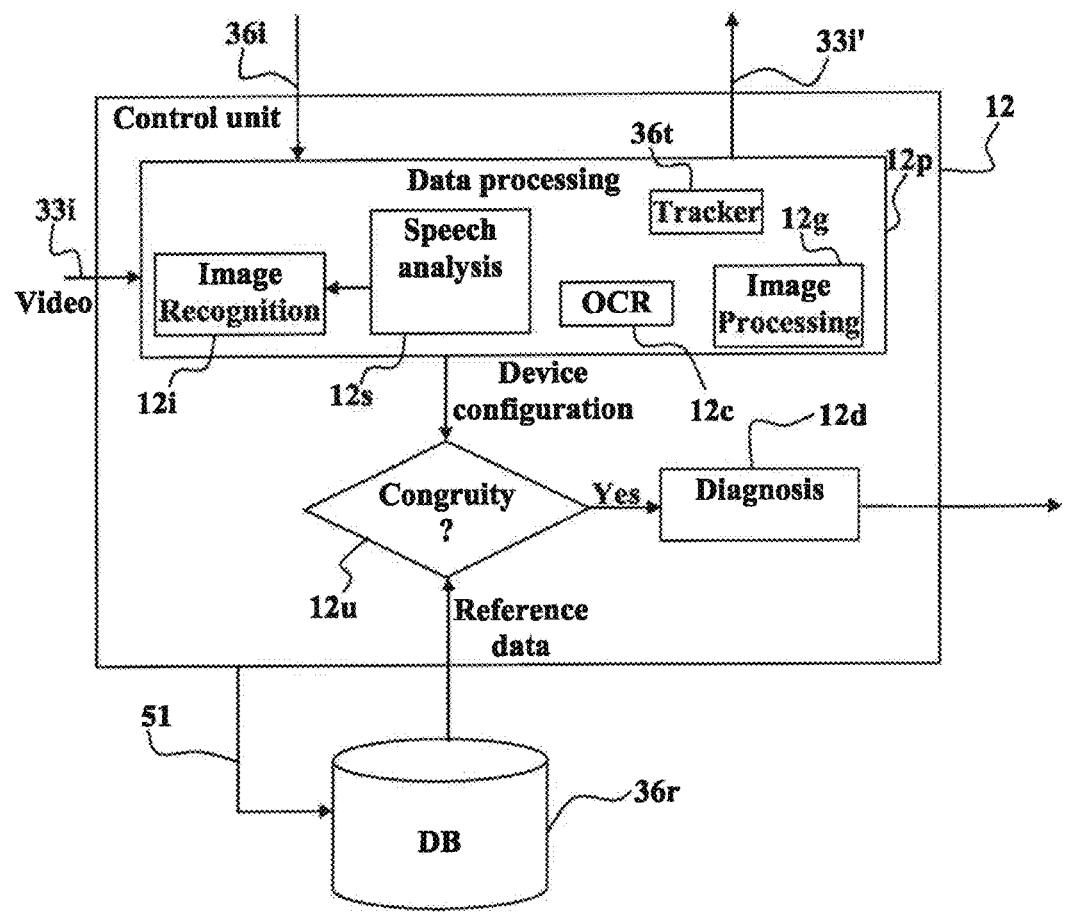
FIG. 3 is a functional block diagram schematically illustrating components of the control unit of the support center.

FIG. 3 is a functional block diagrams showing components of the control unit 12 used at in the TSC in some embodiments. A processor utility 12*p* is used to process the imagery data 33*i* received from the user's device (31), identify in it the failures/defects, and generate the instructive/annotated video stream 33*i'*. The processing utility 12*p* comprises a speech analysis module 12*s* configured and operable to process the auditory signals received from the remote user and identify keywords indicative of the faulty equipment and/or it elements and of the nature of the problems experienced by the user, and an image recognition module 12*s* configured and operable to process the video stream 33*i* from the user's device and detect in it objects/elements related to the problem to be resolved.

The operation of the image recognition module 12*i* may be guided to look for certain elements/items in the imagery data based on keywords identified by the speech analysis module, and/or based on keywords inputs 36*i* from the supporter e.g., by using a pointing device/mouse and/or keywords to focus the image recognition process onto items seen in the imagery data 33*i*. Optionally, an optical character recognition module 12*c* is used to identify letters/symbols and text appearing in the imagery data 33*i*, which can be used to guide the speech analysis module 12*i* and/or the image recognition module 12*i*.

An image processing module 12*g* can be used in the processing utility 12*p* to introduce annotations, signs/symbols and/or text into the imagery data 33*i* based on inputs 36*i* from the supporter for generating the instructive/augmented video steam 33*i'* conveyed to the remote user. The video tracking module 36*t* is used for maintaining continuous connection between the graphics introduced into the imagery data by the supporter and the relevant items/elements moving in the video frames due to the camera movements, or due to actual movements of the relevant objects.

The control unit 12 is configured and operable to use the image recognition module 12*i* to identify setup/configuration of the item/equipment at the remote user end, and to detect the failures/defects therein that possibly causing the problem to be resolved. The database 36*r* can be used to store a plurality of erroneous setups/configurations (also referred to herein as reference data) to be compared by a comparison module 12*u* of the control unit 12 with the setup/configuration identified by the image recognition module 12*i*. Whenever the comparison module 12*u* determines a match, a diagnosis 12*d* is generated by the control unit 12 indicative of erroneous setup/configuration identified in the imagery data 33*i*.

Whenever a support session conducted by the TSC successfully resolve a problem encountered by a remote user, the control unit 12 generates a new database record 51 comprising the data indicative of the resolved problem and of the instructions used by the TSC to resolve it. The new database record is stored in the database 36*r* for use in future support sessions conducted by the TSC. In this specific and non-limiting example a single repository 36*r* is used for storing the reference data and the records 51 of the resolved user's problems, but of course one or more additional repositories can be used for to separately store these records.

Figure 4:
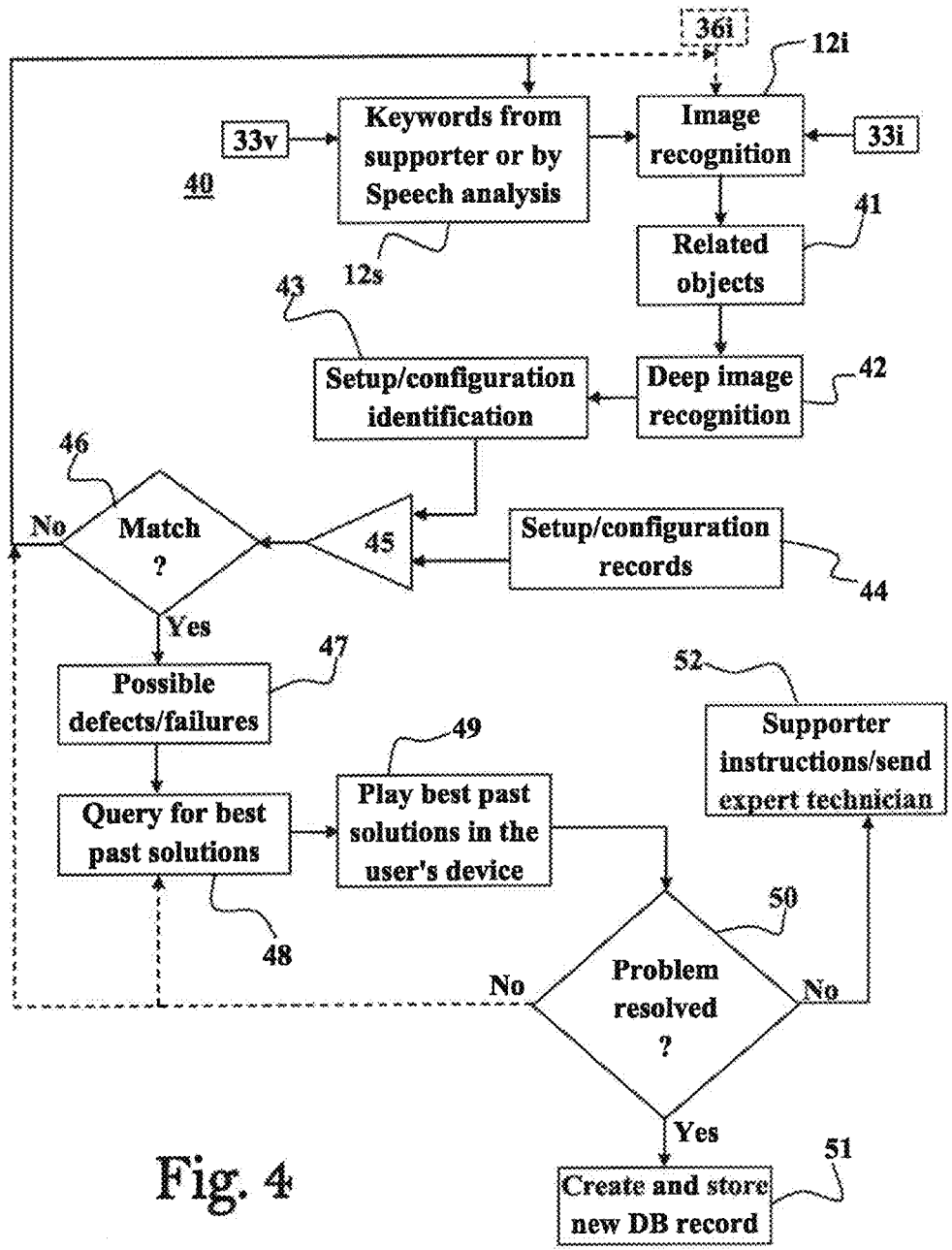
FIG. 4 is a functional flowchart schematically illustrating a support session configured according to some possible embodiments to use and maintain a database of past working solutions.

FIG. 4 is a functional flowchart demonstrating an automated failure/defect detection process 40 employing deep learning, according to some possible embodiments. The imagery data 33*i* received from the camera (31*c*) of the user's device 31 is processes by the image recognition utility 12*i* to identify objects/elements 41 therein related to the problem/fault encountered by the user 33. Optionally, the image recognition utility 12*i* receives guidance 36*i* from the supporter (36*p*) and/or from the control unit 12 of the processor TSC system, to look for particular objects related to the problem the user (33) is facing. Alternatively, and in some embodiments preferably, the speech analysis utility 12*s* is used to process the auditory signals 33*v* obtained from the user (33) to identify keywords uttered by the user, and/or the supporter, during the session (20), which are then used to guide the image recognition utility 12*i* in identifying in the imagery data 33*i* objects/elements related to the problem to be solved. Alternatively, or additionally, the keywords used for aiding the image recognition utility 12*i* are typed by the supporter during the support session.

The imagery data of the objects 41 determined by the image recognition utility 12*i* as being relevant to the problem to be solved undergo deep image processing 42 used for determining one or more possible setups/configurations 43 of the faulty item/equipment (33*e*). A comparison step 45 is then used to compare between the possible setups/configurations 43 identified in the deep image recognition process 42 and setup/configuration records 44 stored in a repository (36*r*) of the TSC 36. Based on the comparison results, block 46 determines if there is a match between at least one of the determined possible setups/configurations 43 and at least one of the setup/configuration records 44.

If the process fails in finding a match in block 46, the control is returned to block 12*s* or 12*i* for further processing of the auditory and/or imagery data (33*v* and/or 33*i* respectively), and/or of any new auditory and/or imagery data obtained during the session (20), for determining new related objects/elements 41, and attempting to identify failures/defects in possible identified setups/configurations, as described hereinabove with reference to blocks 42 to 46. If a match is determined in block 46, possible failures/defects 47 are determined accordingly, and in block 48 the system generates a query to look for the best solution to the determined failures/defects based on the past experience and records ranks maintained in the system. After determining the best past solution for possible failures/defects 47, in block 49 it is presented to the user (33).

The best past solution determined for the possible failures/defects 47 may be provided as an image with added annotations impressed there into by a supporter of a previously conducted support session, and/or a video showing how to achieve the best problem solution (with or without AR insertions), and/or text and/or audible instructions of the same. In this specific and non-limiting example, the deep learning process 40 is configured to compare between faulty/erroneous setup/configuration records 44 obtained from the database of the system and the setup/configuration 43 identified by the deep image recognition 42, such that the match determined in block 46 can provide a precise problem identification based on the past experience of the system and its supporters.

It is however clear that the comparison conducted in block 45 can be configured to identify a match between the setup/configuration 43 identified by the deep image recognition 42 and a database record 44 of a popper/fault-free setup/configuration of the item/equipment 33*e*. In this configuration, if a match is determined in block 46 (i.e., the setup/configuration 43 appears to be correct), the control is passed to blocks 12*s* and or 12*i* for further processing of the imagery and/or auditory data. If there is no match between the setups/configurations, in block 47 the items/elements causing the mismatch are analyzed to determine possible defects/failures accordingly.

If it is determined in block 50 that the best past solution obtained in blocks 48-49 resolved the problem, for which the user initiated the support session, a new database record is constructed in block 51, and then stored in the database of the system for use in future trouble shooting sessions. The database record constructed in block 51 may comprise a video showing how to fix the problem (with or without AR insertions), and/or text and/or audible instructions of the same. If the best past solution did not succeed to resolve the problem other past solution that presented good results are obtained from the database, and presented in attempt to resolve the problem, by repeating steps 48 to 50 for the various successful past solution maintained in the database. Alternatively, or concurrently, the operations of blocks 12*s*, 12*i*, and 41 to 46 can be carried out in attempt to determine other possible failures/defects in the faulty the item/equipment 33*e*.

If after some predefined number of attempts to resolve the problem based on the successful solutions maintained in the database the problem is not resolved, in block 52 the supporter (36*d*) can provide further possible solutions/instructions and/or send a professional technician to the user (33) for resolving the problem.

Conducting the process 40 in numerous technical support sessions, and by applying advance video analytics and deep learning algorithms, eventually yields a self-service mechanism in which the computer vision tools are used to analyze objects/elements in the imagery data 33*i* and identify faulty setups/configuration therein that the TSC system 36 can use to diagnose the current state/conditions of the faulty item/equipment 33*e* and determine therefrom failures and/or defects causing the problems/faults the user 33 encounters. For example, and without being limiting, with these techniques the processing system 12*d* is capable of identifying cable(s) that are disconnected and/or cable(s) that are erroneously connected to the wrong port/sockets, errors indicated by certain LEDs and/or by messages appearing in the user's end display e.g., RF filter is missing in the wall socket connection, and suchlike.

In some embodiments, once the processing system 12*d* identifies the failures/defects causing the problem(s)/fault(s), the tracking utility tracks the relevant objects/elements identified in the imagery data 33*i*, which can accommodate various annotations and relevant symbols, icons and/or signs, as described hereinabove. Accordingly, the computer vision and AR tools are used in some embodiments to facilitate for the supporter 36*p* the process of problem and/or failures/defects identification, which may become extremely difficult with technophobic (or simply technically unskilled) users. This automated problems/failures/defects identification layer is provided in some embodiments instead, or on top, of the conventional remote intervention/guidance of the supporter 33.

In some embodiments database generation and sorting process is used for processing the imagery, auditory and/or textual data obtained in each of the (successful or unsuccessful) support sessions (20) conducted by the system, in order to improve the system's performance and alleviate the supporter's labor in the failure/defects detection process.

Optionally, and in some embodiments preferably, a machine learning process (e.g., employing any suitable state of the art machine learning algorithm having machine vision and deep learning capabilities) is used for assisting in troubleshooting of technical support sessions handled by the system. For example, and without being limiting, the machine learning process can include logging and analyzing users' interactions with the system during the support sessions, in order to identify common users' errors. This way, over time of using the system to conduct support sessions a dynamic database is constructed and maintained for optimization of successful problem solving sessions.

Figure 5A:
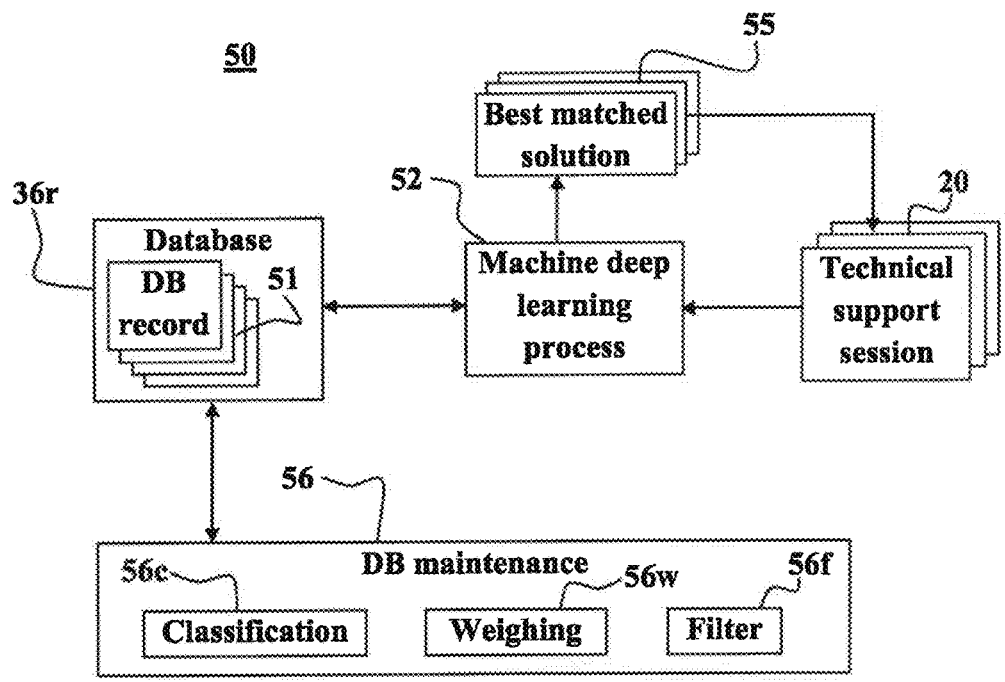
FIGS. 5A and 5B are functional block diagrams of the system utilizing deep/machine learning tools in the support sessions according to some a possible embodiments.

FIG. 5A is a functional block diagram showing a technical support system 50 configured according to some embodiments to maintain and utilize a database 36r of support session records 51 for resolving problems encountered by users of the system. A machine deep learning process 52 is used in the system 50 to process and analyze in real time imagery, auditory and/or textual, data received from a plurality of support sessions 20 conducted by the system 50. In this process the machine deep learning tool 52 classifies each of the currently conducted support sessions 20 to a specific type of problem group (e.g., LAN connectivity, wireless connectivity, bandwidth, data communication rates, etc.), and identify main key words and/or objects/elements mentioned/acquired during the session.

The deep learning tool 52 is used in some embodiments to perform high resolution in depth image recognition processes for identifying the setups/configurations of the faulty item/equipment (33e), as appears in imagery data received from the respective user in each one of the support sessions 20. The setups/configurations identified by the deep learning tool are used by the machine learning tool 52 in its analysis of the support sessions 20 currently conducted by the system 50, to allow it to accurately classify each support session to a correct problem group according to the classification scheme of the system. As will be described below in details, the machine learning tool 52 is used in some embodiments to find in the database best matching solutions 55 possibly usable for respectively solving the problem in each of the currently conducted support sessions 20. This way, machine learning tool 52 can be used to provide the system 50 an automation layer allowing it to solve user's problem without human intervention.

Optionally, and in some embodiments preferably, the deep learning tool 52 is configured and operable to carry out computer vision and video analysis algorithms for analyzing the video/imagery data and autonomously detect therein failures/defects. The failures/defects detected by the deep learning tool 52 can be then used by the machine learning tool 52, and/or the processor 12p to determine possible past solutions from the database 36r to be used by the supporter 36p to resolve a currently conducted support session.

The machine learning process 52 is further configured and operable in some embodiments to process and analyze the data records 51 of the previously conducted support sessions maintained in the database 36r, classify the database records according to the type of problem dealt with in each database record 51, identify main key words and/or objects/elements mentioned/acquired during the support session, and assign a rank/weight to each database record 51 indicative of the number of instances it was successfully used to resolve the problem type/classification of its association.

Figure 5B:
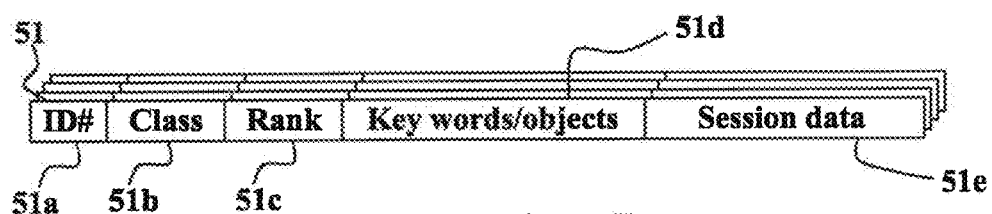

FIG. 5B schematically illustrates a database record 51 according to some possible embodiments. The database record 51 comprises an identifier field 51a (e.g., serial number), a classification field 51b indicating the type of problem the database record 51 was associated with, a key words/objects field 51d indicating the main keywords/objects mentioned/acquired during the respective support session, and session data field comprising the imagery, auditory and/or textual data used during the respective support session to resolve the user's problem.

It is appreciated that the on-line real time assistance provided to the supporters (36p) substantially alleviates the problem definition and defects/failures identification process, and will consequently permit to reduce the training time required to qualify the supporters (36p) for their work, which will let getting the full capability of the supporters, but will also result in less skilled supporters and in substantial costs saving.

The machine leaning tools 52 are configured in some embodiments to scan the records 51 maintained in the database 36r in attempt to match for each of the currently conducted support sessions 20 a best matching solution 55. In this process the machine leaning tools 52 identify a set of database records 51 which classification field matches the specific classification determined for a certain one of the currently conducted support sessions 20. The machine leaning tools 52 then compare the key words/objects field of each of the database records 51 in the set belonging to certain classification to the key words/objects identified in the certain one of the currently conducted support sessions 20, and select therefrom a sub-set of best matching database records 51. Thereafter, the machine leaning tools 52 compare the rank fields 51c of the sub-set of best matching database records 51, and selects therefrom at least one database record 51 having the highest rank to be used by the system 50 to resolve the problem dealt with in the certain one of the currently conducted support sessions 20.

The system 50 comprises in some embodiments a maintenance tool 56 configured and operable to operate in the background and continuously, periodically or intermittently, check the validity of each one of the records 51 of the database 36r. The maintenance tool 56 can determine that certain types of database records 51 are no longer relevant (e.g., relating to obsolete/aged equipment) and thus can be discarded. The maintenance tool 56 can decide to discard database records that were not used again to resolve support sessions conducted by the system, or which had little (or no) success in resolving user's problems.

In some embodiments the maintenance tool 56 comprises a classification module configured and operable to classify the database records, and/or verify the classification determined for each record by the machine learning tools 52. A weighing tool 56w can be used in some embodiments to assign weights and/or ranks to each database record 51. A weight may be assigned to designate the relevance of a record 51 to a certain classification group, such that each record may have a set of weights indicating a measure of relevance of the record to each one of the problems classifications/categories dealt with by the system. A rank is assigned to a record to designate a score/percentage indicative of the number of instances it was successfully used to resolve problems in support sessions conducted by the system 50.

In some embodiments a filtering module 56f is used in the maintenance tool 56 for determining whether to discard one or more database records 51. The filtering module 56f is configured and operable to validate the database records and decide accordingly which of the database records 51 provide valuable solutions and should be maintained. Optionally, and in some embodiments preferably, the filtering tool 56f is configured and operable to maintain only database records having a sufficiently high rank e.g., above some predefined threshold, and discard all other records 51. Alternatively, the filtering tool 56*f* is configured and operable to examine the ranks of all database records 51 belonging to a certain classification group, maintain some predefined number of database records having the highest ranks within each classification group, and discard all other records 51 belonging to the classification group e.g., to keep within each classification group the five (or more, or less) records that received the highest ranks/scores.

As explained hereinabove, the techniques disclosed herein are usable for gradually implementing full self-service operational modes, wherein the system autonomously analyzes the auditory/imagery data from the user to automatically determine possible failures/defects causing the problem(s) the user is experiencing. The system 50 can be thus configured to concurrently conduct a plurality of support sessions 20, without any human intervention, using combined speech and image/video recognition techniques, to extract the proper and relevant keywords from auditory signals and/or text data obtained from the user that describe the experienced problem, and to determine the setup/configuration of the item/equipment at the user's end.

Such combinations of the speech and image/video recognition techniques enable the system 50 to assess the nature of the problem encountered by the user, and to come up with a set of possible solutions from the past working solutions relevant to the specific problem, as provided in the database records maintained and sorted in the database of the system. By using deep learning tools the system gains enhanced problem solving capabilities, thereby guaranteeing that the classical familiar problem encountered by the user will get the best solutions that can be provided. In this case the system is automatically and remotely guiding the user/customer to fix the problem, while online monitoring the user's actions in real time.

In some possible embodiments, where there is poor connectivity, or no connectivity at all, or no need for connectivity, to a technical support center, a set of database records 51 that are relevant to one or more items/equipment belonging to the user and requiring support/maintenance service, can be maintained on the user's device. In such embodiments the user's device can be configured to automatically identify the item/equipment that needs to be serviced, using any of the techniques described herein, or alternatively let the user select the item/equipment that needs to be serviced from a list. Based on the user selection, and/or automatic identification, the user will be provided with the best working solutions as provided in the maintained database records e.g., by playing/showing the recorded augmented reality based instructions. This way, different and specific self-service support modes can be implemented in a user's device of each user, according to the specific items/equipment of the user.

In a case the user's device has temporary connectivity over a communication network (e.g., to the cloud), the best working solution can be downloaded to the user's device using the same user selection, and/or automatic identification procedures, either manually or by pattern recognition techniques.

It should also be understood that in the processes or methods described above, the steps of the processes/methods may be performed in any order or simultaneously, unless it is clear from the context that one step depends on another being performed first.

The technology disclosed herein can be implemented by software that can be integrate into existing CRM systems of technical support centers or organizations, and that can replace it or work in parallel thereto. Such software implementations combines opening voiceless bi-directional video channel, when the customer's smartphone transmits the video image to the supporter/expert, and the supporter/expert gives the customer audiovisual instructions over the communication channel.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As described hereinabove and shown in the associated figures, the present invention provides support session techniques, systems and methods, for fast identification of failures/defects and corresponding working solutions for resolving problems encountered by remote users. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. A system for diagnosing a user's malfunctioning equipment, the system comprising:
   at least one processor configured to:
      transmit to a remote mobile communications device of the user a message having an embedded link to a network address of a remote server configured to establish a bidirectional video session between the communication device and a support center;
      transmit set up instructions to the remote mobile communications;
      receive from an image sensor associated with the mobile communications device image data of the malfunctioning equipment captured by the image sensor;
      cause the received image data to be displayed at the support center for enabling the support center to remotely diagnose a malfunction of the user's equipment;
      transmit to the mobile communications device augmented image data from the support center, the augmented image data including annotations for superimposing on at least one image of the malfunctioning equipment; and
      cause the at least one image of the malfunctioning equipment with superimposed annotations to be presented to the user via the mobile communications device, wherein the superimposed annotations are configured to provide the user with instructions on how to resolve the malfunction.

2. The system of claim 1, wherein the remote server is part of the support center.

3. The system of claim 1, wherein the remote server is a cloud computing infrastructure accessible by the user.

4. The system of claim 1, wherein the at least one processor is configured to transmit a text message including the embedded link.

5. The system of claim 1, wherein a type of the transmitted image data includes at least one of a video stream and a video frame.

6. The system of claim 5, wherein the type of transmitted image data is selected based on available bandwidth.

7. The system of claim 1, wherein when the image data includes a video stream, the at least one processor is configured to anchor the annotations to at least one functional object in the at least one image, such that as a camera angle changes, the annotation remains anchored to the at least one functional object.

8. The system of claim 1 further comprising a repository of working solution records, wherein the at least one processor is further configured to generate in the repository a new working solution record comprising the superimposed annotations.

9. The system of claim 1, wherein the at least one processor is further configured to use an optical character recognition module to identify textual information in the image data for determining at least one property of a setup configuration of the malfunctioning equipment.

10. The system of claim 9, wherein the at least one processor is further configured to generate setup configuration data indicative of setup configuration of the malfunctioning equipment.

11. The system of claim 10, wherein the at least one processor is further configured to use the setup configuration data and reference data indicative of one or more improper setup properties to identify at least one improper setup property associated with the malfunctioning equipment.

12. A method for diagnosing a user's malfunctioning equipment, the method comprising:
- transmitting to a remote mobile communications device of the user a message having an embedded link to a network address of a remote server configured to establish a bidirectional video session between the communication device and a support center;
- transmitting set up instructions to the remote mobile communications;
- receiving from an image sensor associated with the mobile communications device image data of the malfunctioning equipment captured by the image sensor;
- causing the received image data to be displayed at the support center for enabling the support center to remotely diagnose a malfunction of the user's equipment;
- transmitting to the mobile communications device augmented image data from the support center, the augmented image data including annotations for superimposing on at least one image of the malfunctioning equipment; and
- causing the at least one image of the malfunctioning equipment with superimposed annotations to be presented to the user via the mobile communications device, wherein the superimposed annotations are configured to provide the user with instructions on how to resolve the malfunction.

13. The method of claim 12, wherein the remote server is part of the support center.

14. The method of claim 12, wherein the remote server is a cloud computing infrastructure accessible by the user.

15. The method of claim 12, wherein the message include an embedded link is an SMS message.

16. The method of claim 12, wherein a type of the transmitted image data includes at least one of a video stream and a video frame.

17. The method of claim 16, wherein the type of the transmitted image data is selected based on available bandwidth.

18. The method of claim 12, wherein the at least one image is a video stream, and wherein the annotations are anchored to at least one functional element in the at least one image, such that as a camera angle changes, the annotation remains anchored to the at least one functional element.

19. The method of claim 12 further comprising identifying in the image data at least one property of a setup configuration of the malfunctioning equipment and generating setup configuration data indicative the setup configuration data of the malfunctioning equipment.

20. A computer implemented method for conducting a support session, the method comprising:
- transmitting to a remote mobile communications device of a user a message having an embedded link to a network address of a remote server configured to establish a bidirectional video session between the communication device and a support center;
- transmitting setup instructions to the remote mobile communications;
- receiving from an image sensor associated with the mobile communications device image data of the malfunctioning equipment captured by the image sensor;
- causing the received image data to be displayed at the support center for enabling the support center to remotely diagnose the malfunctioning of the user's equipment;
- transmitting to the mobile communications device augmented image data from the support center, the augmented image data including annotations for superimposing on at least one image of the malfunctioning equipment; and
- causing the at least one image of the malfunctioning equipment with superimposed annotations to be presented to the user via the mobile communications device, wherein the superimposed annotations are configured to provide the user with instructions on how to resolve the malfunction.

* * * * *

UNITED STATES PATENT AND TRADEMARK OFFICE
CERTIFICATE OF CORRECTION

PATENT NO. : 10,313,523 B2
APPLICATION NO. : 16/196818
DATED : June 4, 2019
INVENTOR(S) : Amir et al.

It is certified that error appears in the above-identified patent and that said Letters Patent is hereby corrected as shown below:

In the Claims

Claim 1, Column 20, Line 42: "communication device" should read --communications device--.

Claim 1, Column 20, Lines 43-44: "remote mobile communications" should read --remote mobile communications device--.

Claim 12, Column 21, Line 40: "communication device" should read --communications device--.

Claim 12, Column 21, Lines 41-42: "remote mobile communications" should read --remote mobile communications device--.

Claim 15, Column 22, Lines 9-10: "include an" should read --including the--.

Claim 20, Column 22, Line 34: "communication device" should read --communications device--.

Claim 20, Column 22, Lines 35-36: "remote mobile communications" should read --remote mobile communications device--.

Signed and Sealed this
Eighth Day of September, 2020

Andrei Iancu
*Director of the United States Patent and Trademark Office*